(12) United States Patent
Pacha

(10) Patent No.: US 12,224,692 B2
(45) Date of Patent: Feb. 11, 2025

(54) ELECTRIC MOTOR FAULT DETECTION

(71) Applicant: NXP USA, Inc., Austin, TX (US)

(72) Inventor: Matej Pacha, Jihlava (CZ)

(73) Assignee: NXP USA, Inc., Austin, TX (US)

( * ) Notice: Subject to any disclaimer, the term of this patent is extended or adjusted under 35 U.S.C. 154(b) by 186 days.

(21) Appl. No.: 18/059,337

(22) Filed: Nov. 28, 2022

(65) Prior Publication Data

US 2023/0170835 A1    Jun. 1, 2023

(30) Foreign Application Priority Data

Nov. 30, 2021    (EP) .................................... 21211406

(51) Int. Cl.
*H02P 6/182* (2016.01)
*H02P 29/028* (2016.01)

(52) U.S. Cl.
CPC ............ *H02P 29/028* (2013.01); *H02P 6/182* (2013.01)

(58) Field of Classification Search
CPC ...... H02P 6/182; H02P 29/024; H02P 29/028; H02P 21/13
See application file for complete search history.

(56) References Cited

U.S. PATENT DOCUMENTS

| | | | | |
|---|---|---|---|---|
| 5,729,113 | A * | 3/1998 | Jansen | ..................... H02P 21/18 |
| | | | | 318/798 |
| 8,461,789 | B2 * | 6/2013 | Paintz | ..................... H02P 6/182 |
| | | | | 318/609 |
| 9,809,247 | B2 | 11/2017 | Kleinau et al. | |
| 10,075,107 | B2 * | 9/2018 | Lepka | ........................ H02P 6/18 |
| 10,541,632 | B2 * | 1/2020 | Schneider | ............... H02P 21/13 |
| 11,716,037 | B2 * | 8/2023 | Yang | ........................ H02P 6/182 |
| | | | | 318/400.35 |

(Continued)

FOREIGN PATENT DOCUMENTS

| CN | 103248307 A | 8/2013 |
|---|---|---|
| EP | 3185411 A1 | 6/2017 |

OTHER PUBLICATIONS

Slimen et al., "Abrupt Current Sensor Faults Signatures in a Salient PMSM Drive Using The Multiresolution Analysis Technique," 2016 International Conference on Electrical Sciences and Technologies in Maghreb (CISTEM), 6 pages.

(Continued)

*Primary Examiner* — Thai T Dinh

(57) ABSTRACT

An electric motor controller having fault detection comprises: a driver circuit configured to drive an electric motor in response to a received speed demand signal; a measurement circuit configured to measure current through windings of the electric motor, the measurement circuit comprising a back emf, BEMF, observer configured to determine an estimated BEMF value, a BEMF error threshold and an estimated rotor angular speed value from the measured currents; a detector circuit configured to receive the rotor speed demand signal, the estimated BEMF value, the BEMF error threshold, the estimated rotor angular speed value and a measured rotor speed from a rotor speed sensor on the electric motor and to detect a fault in the electric motor controller if the estimated BEMF value lies outside the BEMF error threshold and the measured rotor speed is within a defined rotor speed error threshold.

14 Claims, 5 Drawing Sheets

(56) References Cited

U.S. PATENT DOCUMENTS

| | | | |
|---|---|---|---|
| 11,764,710 B2* | 9/2023 | Kulkarni | H02P 21/0003 |
| | | | 318/400.02 |
| 2005/0029976 A1* | 2/2005 | Terry | H02P 6/12 |
| | | | 318/400.34 |
| 2014/0097777 A1* | 4/2014 | Leong | H02P 7/06 |
| | | | 318/461 |
| 2017/0077835 A1 | 3/2017 | Hirakata | |
| 2017/0126153 A1 | 5/2017 | Lepka et al. | |
| 2018/0115263 A1 | 4/2018 | Buckley et al. | |
| 2020/0169204 A1 | 5/2020 | Lakshmi Narasimha et al. | |

OTHER PUBLICATIONS

Slimen et al., "Easy and effective multiple faults detection and localization method for PMSM drives," 2019 International Conference on Advanced Systems and Emergent Technologies (IC_ASET), 6 pages.

Bisheimer, et al., "Sensorless PMSM Drive with Tolerance to Current Sensor Faults," 2008 34th Annual Conference of IEEE Industrial Electronics, 6 pages.

Khojet El Khil et al., "Diagnosis of Open-Switch and Current Sensor Faults in PMSM Drives Through Stator Current Analysis," IEEE Transactions on Industry Applications, vol. 55, No. 6, Nov./Dec. 2019, 13 pages.

Huang et al., "Robust Reconstruction of Current Sensor Faults for PMSM Drives in the Presence of Disturbances," IEEE/ASME Transactions on Mechatronics, vol. 24, No. 6, Dec. 2019, 12 pages.

\* cited by examiner

ELECTRIC MOTOR FAULT DETECTION

FIELD

The disclosure relates generally to the field of electric motors, and in particular to fault detection in an electric motor controller.

BACKGROUND

Permanent Magnet Synchronous Motors (PMSM) or Brushless DC (BLDC) motors are increasingly popular electric motor designs, which replaces wear-prone brushed DC motors with an electronic controller that improves the reliability of the unit and reduces the footprint and size, making PMSMs or BLDC motors suitable for applications with restricted space. Sensorless motor control techniques may be used to detect a motor component position status for such motors. This may be done by detecting the potential or electromotive force (EMF) generated in the windings which gives rise to secondary magnetic field that opposes the original change in magnetic flux driving the motor's rotation. In resisting the motor's natural movement, the EMF is referred to as a back EMF, BEMF. However, sensorless motor control techniques have a drawback that a rotor mechanical block or stall condition may not be recognized by the sensorless algorithm. The inability to detect a locked or stopped rotor presents potential application safety concerns which are increasingly required for household motor control application standards, such as IEC 60730 ("Automatic electrical controls for household and similar use") or IEC 60335-1 ("House and Similar Electrical appliances"). As a result, some existing solutions for detecting locked rotor conditions are extremely difficult at a practical level.

EP16190311A1 discloses a method for detecting a rotor lock condition in a sensorless PMSM by calculating an estimated rotor speed and estimated BEMF values using a BEMF observer and generating a BEMF error threshold value as a function of the estimated rotor speed subject to a minimum threshold value. A rotor lock condition can be detected if the BEMF falls outside a BEMF threshold. A problem with this approach is that the rotor lock condition can only be detected after the fault has occurred, i.e. once the rotor has physically locked. In some cases this may not provide adequate safety protection, for example when damage could occur as a result of a fault condition.

SUMMARY

According to a first aspect there is provided an electric motor controller comprising:
- a driver circuit configured to drive an electric motor in response to a received speed demand signal;
- a measurement circuit configured to measure current through windings of the electric motor, the measurement circuit comprising a back emf, BEMF, observer configured to determine an estimated BEMF value, a BEMF error threshold and an estimated rotor angular speed value from the measured currents;
- a detector circuit configured to receive the rotor speed demand signal, the estimated BEMF value, the BEMF error threshold, the estimated rotor angular speed value and a measured rotor speed from a rotor speed sensor on the electric motor and to detect a fault in the electric motor controller if the estimated BEMF value lies outside the BEMF error threshold and the measured rotor speed is within a defined rotor speed error threshold.

The detector circuit may be configured to cause the driver circuit to disable the motor if a fault is detected.

The detector circuit may be configured to output a fault indication if a fault is detected.

The rotor speed error threshold may be defined from the rotor speed demand signal.

The rotor speed error threshold may be a range within around +/−5% or +/−10% of the rotor speed demand signal.

According to a second aspect there is provided an electric motor system comprising:
- an electric motor having a stator, a rotor and a rotor speed sensor connected to the rotor; and
- an electric motor controller according to the first aspect.

The electric motor may be a permanent magnet synchronous motor.

According to a third aspect there is provided a method of detecting a fault in an electric motor controller, the electric motor controller comprising:
- a driver circuit configured to drive an electric motor in response to a received speed demand signal;
- a measurement circuit configured to measure current through windings of the electric motor, the measurement circuit comprising a back emf, BEMF, observer configured to determine an estimated BEMF value, a BEMF error threshold and an estimated rotor angular speed value from the measured currents; and
- a detector circuit configured to receive the rotor speed demand signal, the estimated BEMF value, the BEMF error threshold, the estimated rotor angular speed value and a measured rotor speed from a rotor speed sensor on the electric motor, the method comprising the detector circuit detecting a fault in the electric motor controller if the estimated BEMF value lies outside the BEMF error threshold and the measured rotor speed is within a defined rotor speed error threshold.

The detector circuit may cause the driver circuit to disable the motor if a fault is detected.

The detector circuit may output a fault indication if a fault is detected.

The rotor speed error threshold may be defined from the rotor speed demand signal.

The rotor speed error threshold may be a range within around +/−5% or +/−10% of the rotor speed demand signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
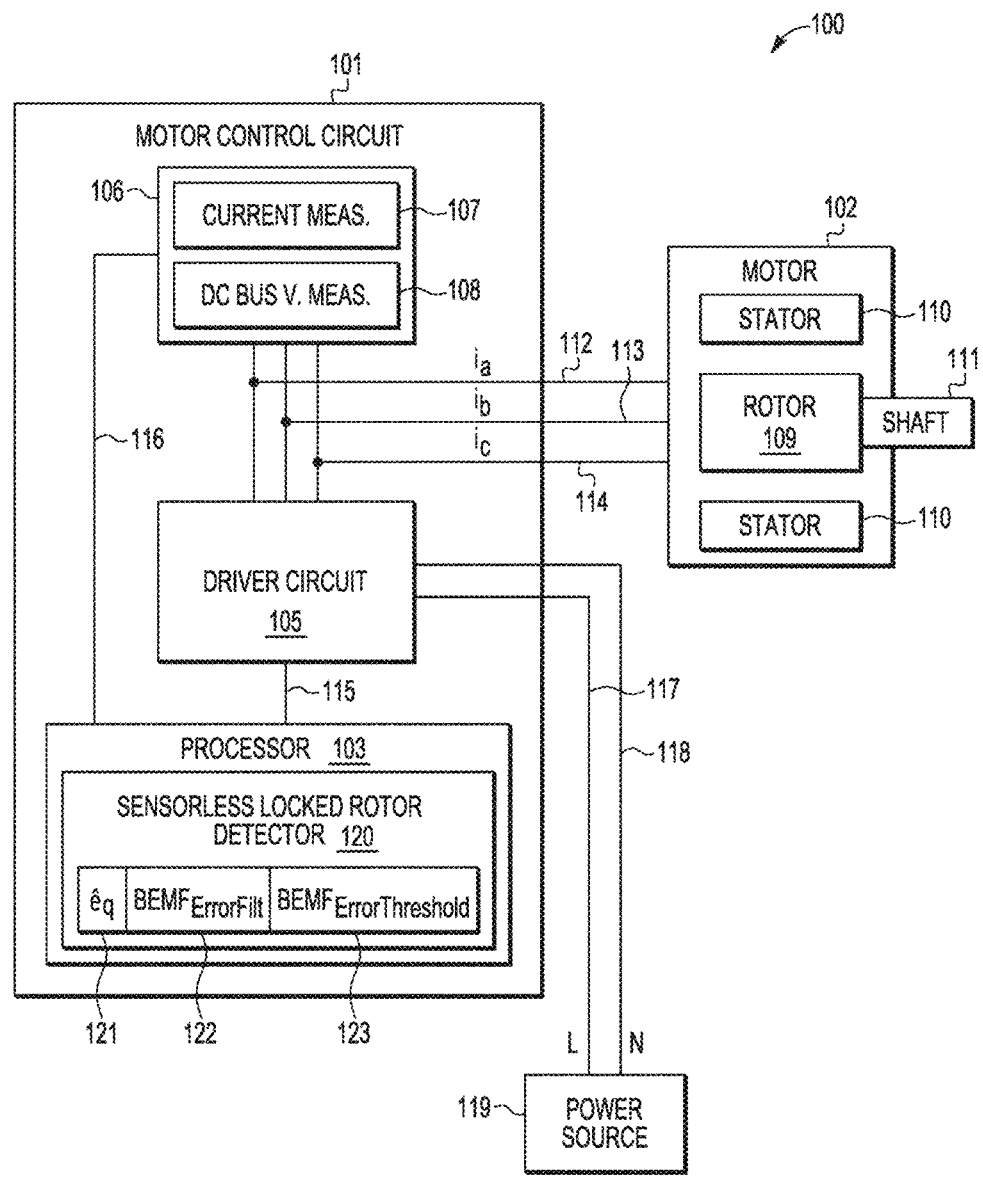
FIG. 1 is a schematic block diagram of an electric motor system comprising a motor control circuit utilizing a sensorless locked rotor detector.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1, reproduced from EP16190311A1 referred to above, is a schematic block diagram of an electric motor system 100, which uses a sensorless locked rotor detector 120. The electric motor system 100 includes a motor control circuit 101, motor 102, and power source 119. The motor control circuit 101 includes a processor 103, driver circuit 105, and measurement circuits 106. Processor 103 includes a sensorless locked rotor detector 120, which may be implemented in hardware or in software by accessing or including memory to store the sensorless locked rotor detector 120. In whatever form implemented, the sensorless locked rotor detector 120 may include first, second and third calculation modules 121, 122, 123 for calculating first and second BEMF values, a filtered BEMF value and a BEMF error threshold value based on outputs from the measurement circuits 106. The first calculation module 121 computes the second estimated BEMF voltage value $\hat{e}_q$ as the q coordinate component of an estimated BEMF value. The second calculation module 122 computes the filtered BEMF difference value as the filtered difference between the first estimated BEMF voltage value $\hat{e}_\delta$ and the second estimated BEMF voltage value $\hat{e}_q$. The third calculation module 123 computes the BEMF error threshold value as a function of the estimated rotor angular speed value $\hat{\omega}$, subject to a minimum or baseline threshold BEMF value.

Measurement circuits 106 include a current measurement circuit 107 and a DC bus voltage measurement circuit 108. The motor 102 includes a rotor 109, stator 110 and shaft 111, the shaft 111 being mechanically coupled to the rotor 109. Windings are disposed in the motor 102, which are connected to the motor control circuit 101 by conductors 112, 113, 114. The conductors 112, 113, 114 are connected to outputs of the driver circuit 105 and to inputs of the measurement circuits 106. The measurement circuits 106 are connected to the processor 103 by one or more connection lines 116. The processor 103 is connected to the driver circuit 105 by one or more connection lines 115 to allow the processor 103 to control the driver circuit 105. The power source 119 is connected to the driver circuit 105 via live (L) and neutral (N) conductors 117, 118 to provide power for the driver circuit 105. The power source 119 may be provided with more than two outputs, for example in a three phase system.

The current measurement circuit 107 obtains one or more current measurements $i_a$, $i_b$, $i_c$ of the motor 102 windings. The DC bus voltage measurement circuit 108 obtains corresponding voltage measurements of the motor 102 windings. Such measurements can be complex measurements, including a direct (d) component and a quadrature (q) component.

Figure 2:
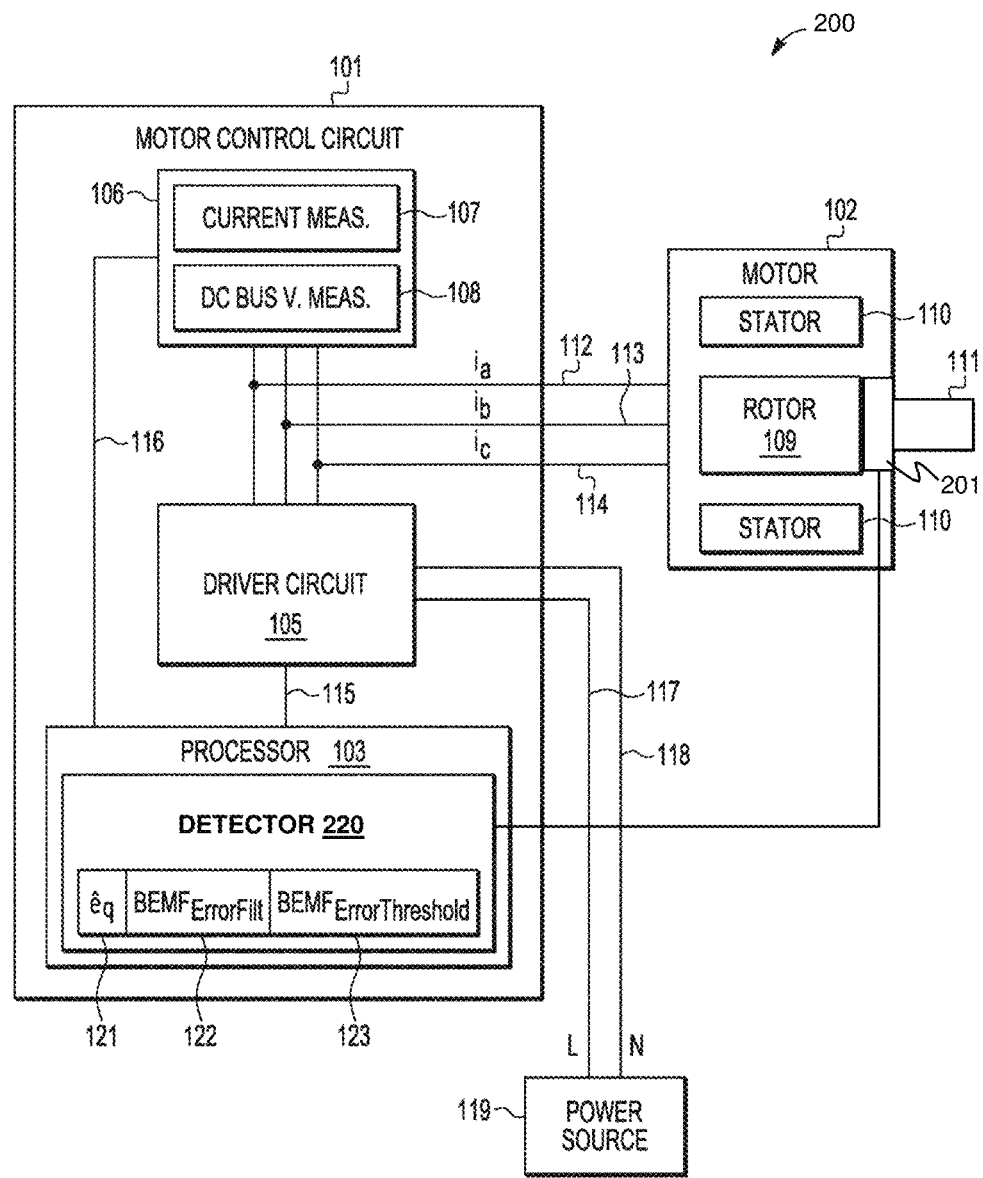
FIG. 2 is a schematic block diagram of an electric motor system comprising a motor control circuit utilizing a motor speed sensor and a detector.

FIG. 2 illustrates an electric motor system 200 based on the electric motor system 100 described above in relation to FIG. 1 but with the motor 102 comprising a rotor speed sensor 201. A rotor speed signal from the rotor speed sensor 201 is transmitted to the detector 220. The detector 220 may be configured to perform the same operations as the sensorless locked rotor detector together with a further function to detect a fault in the current measurement circuit 107 based on the above mentioned BEMF values together with a demanded rotor speed and a measured rotor speed.

Figure 3:
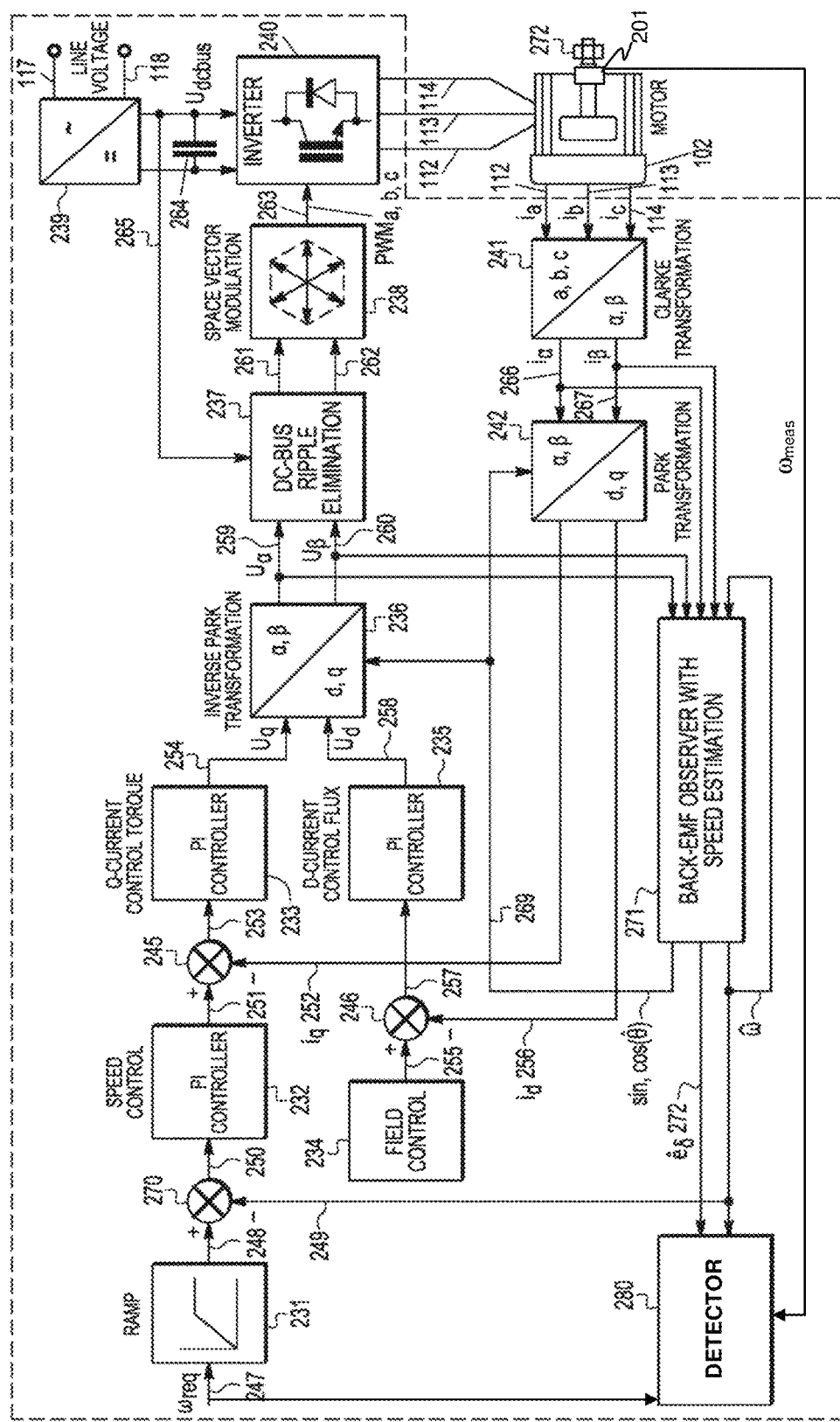
FIG. 3 is a more detailed schematic block diagram of the electric motor system of FIG. 2.

FIG. 3 illustrates a more detailed schematic diagram of the electric motor system 200 of FIG. 2, indicating in more detail the components of the motor control circuit 101, including the detector 280, motor drive circuit 105 and measurement circuits 106. The motor drive circuit 105 and measurement circuits 106 are distributed among the components shown in FIG. 3, with the measurement circuits comprising the Clarke transformation block 241, Park transformation block 242, and BEMF observer 271. Operation of the system 200 is similar to that disclosed in EP16190311A1 with the addition of a required or demanded speed input $\omega_{req}$ and a measured rotor speed input $\omega_{meas}$ input to the detector 280 together with the outputs of estimated voltage value $\hat{e}_\delta$ and estimated speed value $\hat{\omega}$ from the BEMF observer 271.

The electric motor system 200 comprises control system elements 101 for providing fault detection based on BEMF observation with rotor speed estimation together with measured and requested speed values. The motor control circuit 101 includes ramp block 231, speed control block 232, quadrature-current (Q-current) control torque block 233, field control block 234, direct-current (D-current) control flux block 235, inverse Park transformation block 236, direct-current (DC) bus ripple elimination block 237, space vector modulation block 238, alternating-current-to-direct-current (AC-to-DC) power conversion block 239, inverter block 240, Clarke transformation block 241, Park transformation block 242, and BEMF tracking observer block 271 for estimating position and speed.

In operation, the ramp block 231 receives a requested angular velocity signal $\omega_{req}$ at input 247 and provides an output 248 to adjustment block 270. Adjustment block 270 receives an estimated angular velocity signal $\hat{\omega}$ at output 249 of BEMF observer block 271. Adjustment block 270 subtracts $\hat{\omega}$ from $\omega_{req}$ to provide an angular velocity control signal to speed control block 232 at output 250. Speed control block 232 may be implemented, for example, using a proportional integral (PI) controller. Speed control block 232 provides an output signal to adjustment block 245 at output 251. Adjustment block 245 receives a signal from Park transformation block 242 at output 252. Adjustment block 245 subtracts the signal at output 252 from the signal at output 251 to provide a signal at output 253 to Q-current control torque block 233. Q-current control torque block 233 may be implemented, for example, using a PI controller. Q-current control torque block 233 provides a signal Uq at output 254 to inverse Park transformation block 236. In this case, the signal Uq represents the q coordinate component for the rotor related orthogonal coordinate reference frame system (d,q).

Field control block 234 provides a field control signal to adjustment block 246 at output 255. Adjustment block 246 receives a motor current vector signal id from Park transformation block 242 at output 256, where id is the d coordinate component that is collinear to the rotor flux d coordinate. Adjustment block 246 subtracts the id signal at output 256 from the field control signal at output 255 and provides a signal at output 257 to D-current control flux block 235. D-current control flux block 235 may be implemented, for example, using PI controller. D-current control flux block 235 provides a signal Ud at output 258 to inverse Park transformation block 236. In this case, the signal Ud represents the d coordinate component for the rotor related orthogonal coordinate reference frame system (d,q).

Inverse Park transformation block 236 provides a signal Uα at output 259 to DC bus ripple elimination block 237 and to the BEMF observer block 271, and also provides a signal Uβ at output 260 to DC bus ripple elimination block 237 and to the BEMF observer block 271. In this case, the signals Uα, Uβ represent orthogonal coordinate components for the stator related orthogonal coordinate reference frame system (α, β). DC bus ripple elimination block 237 receives a signal Udcbus from output 265 of AC-to-DC power conversion block 239. DC bus ripple elimination block 237 provides compensation for ripple on the signal Udcbus and provides signals at outputs 261 and 262 to space vector modulation block 238. Space vector modulation block 238 provides pulse width modulation (PWM) motor drive signals $PWM_{a,b,c}$ to inverter block 240 at outputs 263. A line conductor 117 provides a line voltage to AC-to-DC power conversion block 239. A neutral conductor 118 provides a neutral voltage to AC-to-DC power conversion block 239. AC-to-DC power conversion block 239 provides DC voltages to inverter block 240 at one or more outputs 265 which are filtered using DC bus capacitor 264 across the outputs. Inverter block 240 provides motor drive signals at conductors 112, 113, and 114 to electric motor 102 according to PWM motor drive signals $PWM_{a,b,c}$.

Conductors 112, 113, and 114 from electric motor 102 provide signals (e.g., $i_a$, $i_b$ and $i_c$) to inputs of Clarke transformation block 241. Clarke transformation block 241 provides signals $i_\alpha$ and $i_\beta$ to Park transformation block 242 and to BEMF observer block 271 at outputs 266 and 267. Park transformation block 242 receives sin, cos ($\hat{\theta}$)—the sine and cosine of the estimated the rotor flux angle $\hat{\theta}$ relative to stator phase—at output 269 from BEMF observer block 271. Park transformation block 242 provides a d component motor current vector signal (e.g., $i_d$) at output 256 to adjustment block 246 and a q component motor current vector signal (e.g., $i_q$) at output 252 to adjustment block 245, where the d coordinate component of the motor current vector $i_d$ is collinear to the rotor flux d coordinate, and where the q coordinate component of the motor current vector $i_q$ is orthogonal to the rotor flux d coordinate. BEMF observer block 271 provides estimated angular velocity signal $\hat{\omega}$ to adjustment block 270 and to position and speed observer block 271 at output 249. BEMF observer block 271 also provides sin, cos ($\hat{\theta}$) at output 269 to inverse Park transformation block 236 and to Park transformation block 242. In addition, the BEMF observer block 271 provides estimated BEMF signal value $\hat{e}_\delta$ at output 272, though this value may also be used by the BEMF observer block 271 to generate the angle error $\theta_{error}$.

The motor 102 is provided with a position or rotation sensor 201, the output from which provides a measured rotor speed signal $\omega_{meas}$. The detector 280 also generates an estimated angular velocity signal $\hat{\omega}$ (which specifies the rotor angular speed) and one or more of the BEMF voltage values $\hat{e}_\delta$ and $\hat{e}_\gamma$. Using one or more of these estimated quantities, detector 280 may execute one or more algorithms to derive a BEMF error threshold value ($BEMF_{ErrorThreshold}$) and a filtered BEMF difference value ($BEMF_{ErrorFilt}$) for processing with the estimated rotor angular speed value and measures rotor speed signal to detect one or more types of faults.

Further details of the operation of the BEMF observer 271 are described in EP16190311A1, which describes the use of the BEMF error threshold value to determine a blocked rotation fault without the use of a position or rotation sensor on the motor. In applications where these and other types of faults need to be detected in time to prevent damage occurring to the motor or driving circuit, a motor speed sensor 201 can be used in combination with the outputs from the BEMF observer 271.

Figure 4:
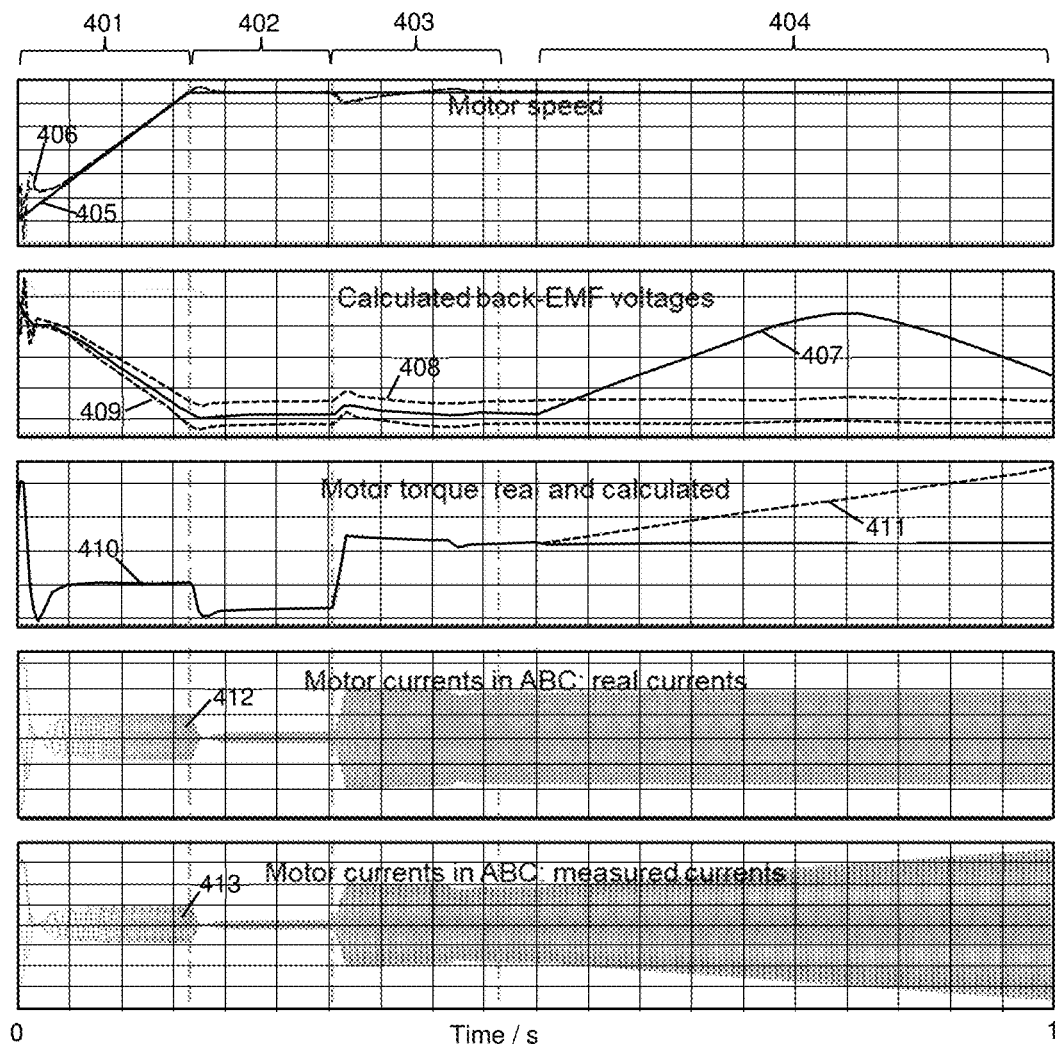
FIG. 4 is an example series of simulated plots of motor speed, calculated BEMF, motor torque and motor currents as a function of time.

FIG. 4 illustrates an example of a series of measured and calculated values for a motor control system in which a fault may be determined using a measured motor speed in combination with calculated BEMF values. FIG. 4 illustrates motor speed, calculated BEMF voltages, motor torque and motor currents for a simulated series of operations covering a startup period 401, a no-load period 402, a transient loaded period 403 and a fault injection period 404. During the startup period 401, the motor speed demand signal 405 rises and the measured and estimated motor speeds 406 (which are indistinguishable in FIG. 4 due to overlap) rise along with the demand signal 405. Along with this, the calculated BEMF values 407, 408, 409 change accordingly. A lower BEMF bound 409 and an upper BEMF bound 408 lie either side of a calculated BEMF value 407 during this period and during the subsequent non-load period 402 and load transient period 403. The upper and lower bounds 408, 409 define the BEMF error threshold and the calculated BEMF value 407 is the estimated BEMF signal $\hat{e}_\delta$, as described in more detail in EP16190311A1. At the start of the fault injection period 404, a gradual gain fault is introduced, which leads the estimated BEMF signal $\hat{e}_\delta$ to move outside the BEMF error threshold defined by the upper and lower bounds 408, 409.

As in EP16190311A1, a fault may be detected if the estimated BEMF signal 407 lies outside the threshold region defined by upper and lower bounds 408, 409 or if the estimated rotor angular speed value 406 falls below a minimum stall speed. Another type of fault may be detected if the measured rotor angular speed value 406 differs from the required rotor speed $\omega_{req}$ or estimated rotor speed $\hat{\omega}$ by no more than a predefined amount, for example within +/−5% or +/−10%. A measure of the actual rotor speed is required for determination of such faults, which may relate to faults within the motor control circuit 101 rather than in the motor 102. Such faults may for example result from a gain or offset error in the current measurement circuit 107, which may be gradual or abrupt, or from an input to the current measurement circuit 107 being disconnected. Such faults can be detected when the estimated BEMF signal lies outside the BEMF threshold defined by the upper and lower bounds 408, 409 while the measured rotor speed value 406 is within a rotor speed error threshold. In a general aspect therefore, a fault in the motor control circuit may be detected by the detector 280 when the estimated BEMF signal $\hat{e}_\delta$ lies outside of a calculated BEMF error threshold and the measured rotor angular speed is within a rotor speed error threshold.

The fault may for example be indicated, as shown in FIG. 4, by the measured rotor speed 406 being maintained after injection of the fault (i.e. at the start of the fault injection period 404) while the estimated BEMF value 407 falls outside the BEMF error threshold. As the estimated BEMF signal 407 rises above the upper BEMF bound 408 within around 50 ms of the fault being injected, the calculated torque 411 rises above the measured torque 410 and the measured currents 413 begin to rise, while the measured rotor speed 406 remains constant. In other examples, a fault may be indicated by the calculated torque and measured currents rising, falling or oscillating while the measured speed is maintained within the rotor speed error threshold.

An advantage of determining a fault in the motor control circuit using a combination of the estimated BEMF signal and a measured rotor speed is that the fault can be detected prior to the motor exhibiting any changes that may result from the error. Any damage that might result from the fault could therefore be prevented by detecting the fault early and, for example, disabling the motor.

Figure 5:
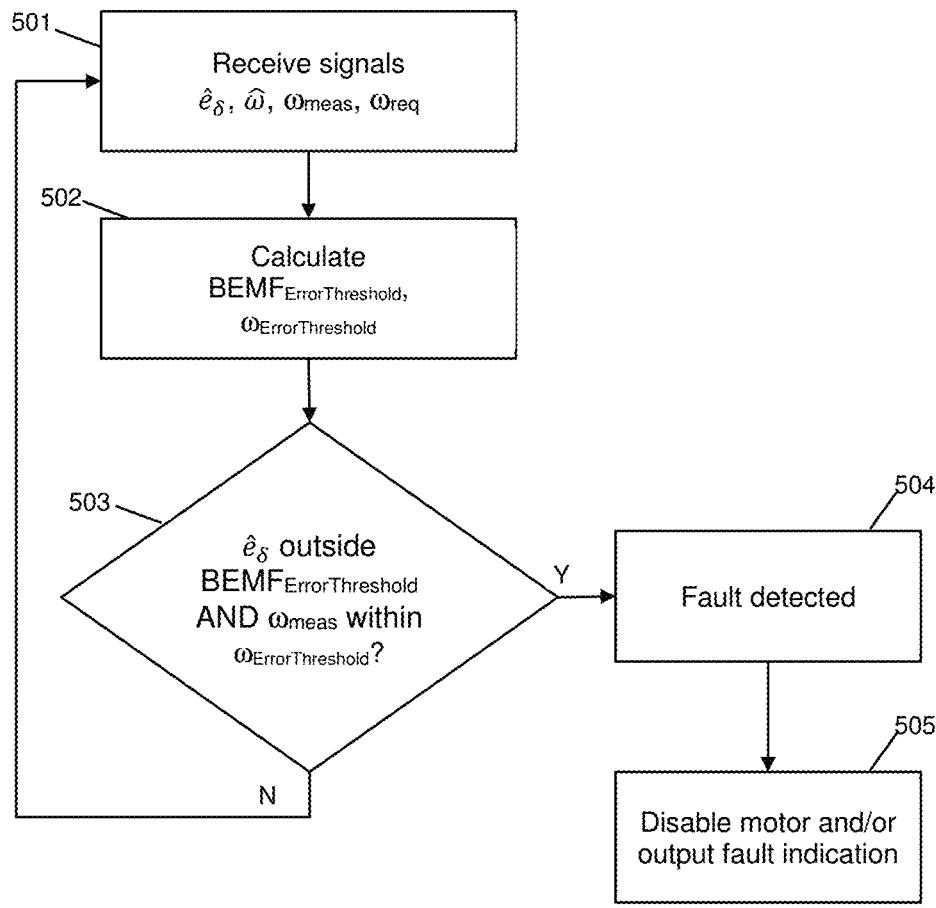
FIG. 5 is a schematic flow diagram illustrating an example method of detecting a fault in an electric motor controller.

FIG. 5 illustrates a schematic diagram of a method of detecting a fault in a PMSM control circuit during operation of the PMSM. In a first step 501, the detector 280 receives an estimated BEMF value $\hat{e}_\delta$ and an estimated rotor speed value $\hat{\omega}$ from the BEMF observer 271, a measured rotor speed $\omega_{meas}$ from the rotor speed sensor 201 and a required rotor speed $\omega_{req}$ from the driving circuit 105. The detector 280 then calculates a BEMF error threshold, $BEMF_{ErrorThreshold}$ and a rotor speed threshold (step 502), the rotor speed threshold being determined from either or both of the estimated rotor speed value $\hat{\omega}$ and the required rotor speed $\omega_{req}$. The detector 280 then compares the estimated BEMF value $\hat{e}_\delta$ to the BEMF error threshold value (step 503) and the measured rotor speed to the rotor speed threshold. If the estimated BEMF value $\hat{e}_\delta$ is outside the BEMF error threshold and the measured rotor speed $\omega_{meas}$ is within the rotor speed threshold, a fault is detected (step 504). The detector 280 may then disable the motor and/or output a fault indication (step 505).

Other fault detection processes may also operate along with the above described process, for example to monitor the measured rotor speed compared to the required motor speed to detect a locked rotor fault.

From reading the present disclosure, other variations and modifications will be apparent to the skilled person. Such variations and modifications may involve equivalent and other features which are already known in the art of memory systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An electric motor controller comprising:
    a driver circuit configured to drive an electric motor in response to a received speed demand signal;
    a measurement circuit configured to measure current through windings of the electric motor, the measurement circuit comprising a back emf (BEMF) observer configured to determine an estimated BEMF value, a BEMF error threshold and an estimated rotor angular speed value from the measured currents;
    a detector circuit configured to receive the rotor speed demand signal, the estimated BEMF value, the BEMF error threshold, the estimated rotor angular speed value and a measured rotor speed from a rotor speed sensor on the electric motor and to detect a fault in the electric motor controller if the estimated BEMF value lies outside the BEMF error threshold and the measured rotor speed is within a defined rotor speed error threshold.

2. The electric motor controller of claim 1, wherein the detector circuit is configured to cause the driver circuit to disable the motor if a fault is detected.

3. The electric motor controller of claim 1, wherein the detector circuit is configured to output a fault indication if a fault is detected.

4. The electric motor controller of claim 1, wherein the rotor speed error threshold is defined from the rotor speed demand signal.

5. The electric motor controller of claim 1, wherein the rotor speed error threshold is a range within around +/−10% of the rotor speed demand signal.

6. The electric motor controller of claim 1, wherein the rotor speed error threshold is a range within around +/−5% of the rotor speed demand signal.

7. An electric motor system comprising:
    an electric motor having a stator, a rotor and a rotor speed sensor connected to the rotor; and
    an electric motor controller comprising:
    a driver circuit configured to drive an electric motor in response to a received speed demand signal;
    a measurement circuit configured to measure current through windings of the electric motor, the measurement circuit comprising a back emf (BEMF) observer configured to determine an estimated BEMF value, a BEMF error threshold and an estimated rotor angular speed value from the measured currents;
    a detector circuit configured to receive the rotor speed demand signal, the estimated BEMF value, the BEMF error threshold, the estimated rotor angular speed value and a measured rotor speed from a rotor speed sensor on the electric motor and to detect a fault in the electric motor controller if the estimated BEMF value lies outside the BEMF error threshold and the measured rotor speed is within a defined rotor speed error threshold.

8. The electric motor system of claim 7, wherein the electric motor is a permanent magnet synchronous motor.

9. A method of detecting a fault in an electric motor controller, the electric motor controller comprising:
    a driver circuit configured to drive an electric motor in response to a received speed demand signal;
    a measurement circuit configured to measure current through windings of the electric motor, the measurement circuit comprising a back emf (BEMF) observer configured to determine an estimated BEMF value, a BEMF error threshold and an estimated rotor angular speed value from the measured currents; and
    a detector circuit configured to receive the rotor speed demand signal, the estimated BEMF value, the BEMF error threshold, the estimated rotor angular speed value and a measured rotor speed from a rotor speed sensor on the electric motor,
    the method comprising the detector circuit detecting a fault in the electric motor controller if the estimated BEMF value lies outside the BEMF error threshold and the measured rotor speed is within a defined rotor speed error threshold.

10. The method of claim 9, wherein the detector circuit causes the driver circuit to disable the motor if a fault is detected.

11. The method of claim 9, wherein the detector circuit outputs a fault indication if a fault is detected.

12. The method of claim 9, wherein the rotor speed error threshold is defined from the rotor speed demand signal.

13. The method of claim 9, wherein the rotor speed error threshold is a range within around +/−10% of the rotor speed demand signal.

14. The method of claim 9, wherein the rotor speed error threshold is a range within around +/−5% of the rotor speed demand signal.

* * * * *